United States Patent
Luh (10) Patent No.: US 11,290,049 B2
(45) Date of Patent: Mar. 29, 2022

(54) METHOD FOR CONTROLLING MOTOR-DRIVEN PUMP IN A FLUID SYSTEM

(71) Applicant: Chuh Hwa Luh, Yilan County (TW)

(72) Inventor: Chuh Hwa Luh, Yilan County (TW)

( * ) Notice: Subject to any disclaimer, the term of this patent is extended or adjusted under 35 U.S.C. 154(b) by 137 days.

(21) Appl. No.: 16/927,712

(22) Filed: Jul. 13, 2020

(65) Prior Publication Data

US 2021/0028738 A1 Jan. 28, 2021

(51) Int. Cl.
*H02P 27/04* (2016.01)
*F04B 49/20* (2006.01)

(52) U.S. Cl.
CPC ............ *H02P 27/045* (2013.01); *F04B 49/20* (2013.01); *F04B 2203/0404* (2013.01); *F04B 2205/04* (2013.01); *F04B 2205/09* (2013.01)

(58) Field of Classification Search
CPC ............... H02P 27/045; F04B 49/20; F04B 2203/0404; F04B 2205/05; F04B 2205/09
See application file for complete search history.

(56) References Cited

U.S. PATENT DOCUMENTS

| | | | | |
|---|---|---|---|---|
| 6,414,455 | B1 * | 7/2002 | Watson | F04B 47/02 318/432 |
| 2002/0088241 | A1 * | 7/2002 | Suitou | F04B 49/20 62/228.4 |
| 2016/0053754 | A1 * | 2/2016 | Kang | F04B 39/122 417/45 |
| 2017/0002635 | A1 * | 1/2017 | Williams | F04B 47/022 |
| 2018/0010599 | A1 * | 1/2018 | Hernandez Martinez | B41J 2/175 |
| 2018/0291901 | A1 * | 10/2018 | Yabe | F04C 18/16 |
| 2019/0331117 | A1 * | 10/2019 | Gable | F04B 9/10 |
| 2021/0199006 | A1 * | 7/2021 | Adams | E21B 47/117 |

* cited by examiner

*Primary Examiner* — Patrick Hamo
(74) *Attorney, Agent, or Firm* — Donald E. Stout; Stout, Uxa & Buyan, LLP (57) ABSTRACT

A method for controlling a motor-driven pump in communication with a fluid system is provided. Preferably the method employs a frequency drive system to control the motor-driven pump. The control method is characterized in that the operating frequency of the motor can be adjusted very quickly and it is ensured to be operated in a safe frequency range no more than a rated current.

17 Claims, 6 Drawing Sheets

METHOD FOR CONTROLLING MOTOR-DRIVEN PUMP IN A FLUID SYSTEM

CROSS-REFERENCE TO RELATED APPLICATIONS

The entire contents of Taiwan Patent Application No. 108126392, filed on Jul. 25, 2019, from which this application claims priority, are expressly incorporated herein by reference.

BACKGROUND OF THE INVENTION

1. Field of the Invention

The present invention relates to a method for controlling a motor-driven pump in a fluid system.

2. Description of Related Art

A Variable Frequency Drive (VFD) is a type of motor controller that drives an electric motor by varying the frequency and voltage supplied to the electric motor. Frequency (or hertz) is directly related to the motor's speed (RPMs). The higher the frequency, the faster the RPMs. If an application does not require an electric motor to run at full speed, the VFD can adjust the frequency of the motor by varying its current or voltage to meet the requirements of the electric motor's load. As the application's motor speed requirements change, the VFD can simply turn up or down the motor speed to meet the speed requirement.

Variable frequency drives (VFDs) have been widely used to motor-driven pumps of hydraulic systems. For example, US Patent Publication No. US2017/02341147 to Kidd et al. discloses a method of controlling a pump and motor. The method utilizes a variable frequency drive system to control a pump driven by a motor with the pump in communication with a fluid system. The method includes monitoring a pressure in the fluid system, monitoring and adjusting an operating frequency of the motor to maintain the pressure at a pressure set point, and, based on the monitored operating frequency, causing the pump to temporarily boost the pressure in the fluid system to a temporary boost set point for a first time period. The method also includes determining whether the temporarily boosted pressure in the fluid system stays above the pressure set point for a second time period and causing the pump to enter a sleep mode when the temporarily boosted pressure stays above the pressure set point through the second time period.

In detail, the variable frequency drive system includes a controller that implements a classical Proportional/Integral/Derivative (PID) method using pressure error as an input. Pressure error is calculated by subtracting an actual water pressure from the desired water pressure (i.e., a pressure set point). An updated speed control command can then be generated by multiplying the pressure error by a proportional gain, multiplying the integral of the pressure error by an integral gain, multiplying the derivative of the pressure error by a derivative gain, and summing the results. Thus, the controller can increase or decrease the speed of the motor to maintain a constant pressure set point. The controller continuously determines if the pressure is at a programmed set point. If the pressure is not at the programmed set point, PID feedback control is used to ramp the frequency until the pressure reaches the set point.

In some applications, however, in response to an instantaneous change of a set pressure or flow rate, the PID control is slow to reach the set pressure or flow rate. This may result in a shutdown of the pump.

SUMMARY OF THE INVENTION

An object of this invention is to provide a method for controlling a motor-driven pump in a fluid system.

According to an embodiment of the present invention, a method for controlling a pump in a fluid system is provided, wherein the pump discharges a fluid through one of a plurality of outlets having different diameters and is driven by a motor, and the method comprises the steps of: obtaining a current flow rate of the discharged fluid according to a monitoring frequency of the motor; obtaining an outlet equivalent diameter according to a current pressure of the discharged fluid and the current flow rate; obtaining a target flow rate according to the outlet equivalent diameter and a target pressure of the discharged fluid; obtaining a target frequency according to the target flow rate; and adjusting a frequency of the motor to the target frequency.

In one embodiment, the method further comprises: determining a maximum operating frequency and a minimum operating frequency of the motor based on a diameter of the outlet that is selected to discharge the fluid; and determining whether the target frequency is between the maximum operating frequency and the minimum operating frequency.

In one embodiment, the maximum operating frequency and the minimum operating frequency are determined by the steps of: dynamically obtaining at least three data sets of operating frequency and operating current of the motor; determining a polynomial based on the at least three data sets of operating frequency and operating current of the motor; obtaining a rated current of the motor; and intersecting the polynomial with the rated current to determine the maximum operating frequency and the minimum operating frequency.

In one embodiment, the polynomial comprises a unitary quadratic equation, a unitary cubic equation, a unitary polynomial equation, an exponential equation, or a natural logarithmic equation.

In one embodiment, the polynomial is obtained by Lagrange Interpolation using the at least three data sets.

In one embodiment, if the target frequency is between the maximum operating frequency and the minimum operating frequency, then the frequency of the motor is adjusted to the target frequency.

In one embodiment, if the target frequency is greater than the maximum operating frequency, then the target frequency is lowered to a decreased frequency between the maximum operating frequency and the minimum operating frequency, and the operating frequency of the motor is adjusted to the decreased frequency.

In one embodiment, if the target frequency is less than the minimum operating frequency, then a part of the fluid discharged by the pump is returned to a liquid source or an inlet of the pump via a returning device, and the flow rate of the discharged fluid is increased to an increased flow rate.

In one embodiment, the method further comprises: calculating a boosted frequency according to the increased flow rate; and adjusting the frequency of the motor to the boosted frequency.

DETAILED DESCRIPTION OF THE PREFERRED EMBODIMENT

The detailed description of the present invention will be discussed in the following embodiments, which are not intended to limit the scope of the present invention, but can be adapted for other applications. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts. It should be noted that any drawing presented are in simplified form and are not to precise scale.

Figure 1:
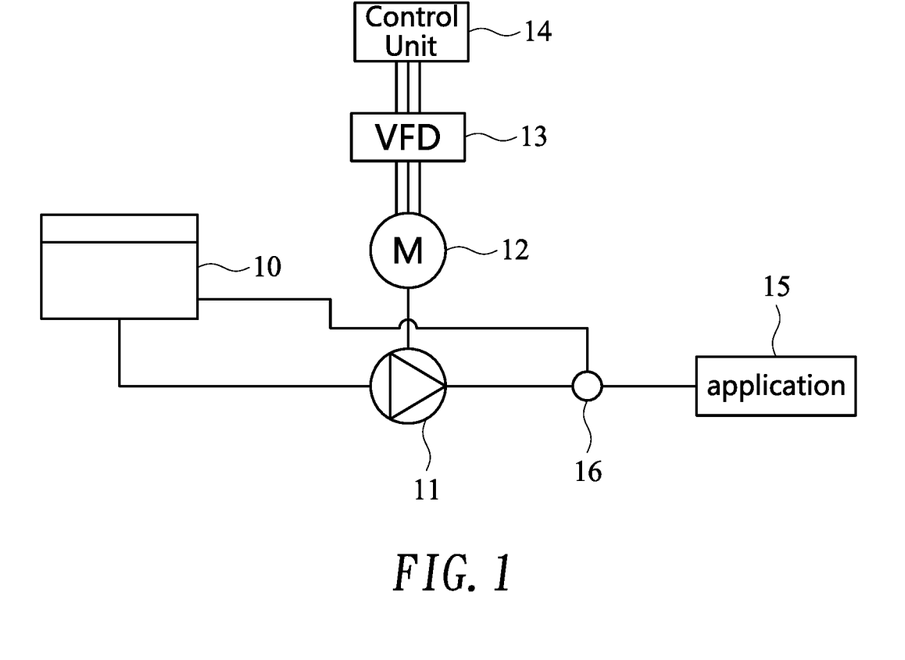
FIG. 1 is a block diagram showing a fluid system according to an embodiment of the present invention.

FIG. 1 is a schematic view showing a fluid system according to an embodiment of the present invention. Referring to FIG. 1, the fluid system may comprise, but is not limited to, a fluid source 10, a pump 11, a motor 12, a variable frequency drive (VFD) 13, a control unit 14, and an application 15. The fluid source 10 may be a tank or a reservoir storing a fluid. In one embodiment, the fluid source 10 is an outlet pipe of another pump. The fluid may be, but is not limited to, water, oil, coolant, saturated liquid, or seawater. In one embodiment, the fluid source 10 supplies the fluid to the pump 11 at a given pressure and/or flow rate. The pump 10 can be a positive displacement pump or a centrifugal pump and is preferably the former, such as, a gear pump, a plunger pump, or a split pump. In one embodiment, the pump 11 is driven directly by the motor 12. In one embodiment, the motor 12 drives the pump 11 through one or more belts or gears.

Referring to FIG. 1, a bypass valve 16 acting as a relief valve may be used to return all or a part of the fluid discharged by the pump 11 back to either a liquid source (e.g., a storage reservoir) or the inlet of the pump 11.

The control unit 14 provides a means for an operator to start and stop the motor and adjust the operating frequency of the motor 12 through the VFD 13. In one embodiment, the control unit 14 comprises a human-machine interface (HMI) that connects the VFD 13. The HMI can be used to visually display data, monitor inputs and outputs of VFD 13, and more. Additional operator control functions might include switching between manual speed adjustment and automatic control from an external process control signal. The HMI may include a display to provide information about the operation of the drive. An operator interface keypad and display unit may be provided on the front of the VFD controller 13. The keypad display may be cable-connected and mounted a short distance from the VFD controller 13. Input and output (I/O) terminals may be provided for connecting push buttons, switches, and other operator interface devices or control signals. A serial communications port may be available to allow the VFD to be configured, adjusted, monitored, and controlled using a computer.

In one embodiment, the control unit 14 comprises a programmable logic controller (PLC) to program the VFD 13, hence to control the motor 12. The programmable logic controller supports digital input/output effectively. In one embodiment, the control unit 14 comprises a programmable logic controller (PLC) and a human-machine interface (HMI). In one embodiment, the control unit 14 comprises a programmable logic controller (PLC) and an integrated circuit. Depending on the model, the operating parameters of the VFD 13 can be programmed via the programmable logic controller (PLC), internal keypad, external keypad, or a memory card (such as secure digital memory card).

In one embodiment, parameters are read from output terminals of the VFD 13. The VFD 13 may create harmonic distortion, and a filter may be used to reduce VFD distortion. Using a harmonic filter reduces the amount of harmonic current; therefore, the voltage distortion is reduced. In one embodiment, the parameters read by the VFD are first filtered by software. By statistical methods, the noises can be excluded.

The number of the application 15 can be singular or plural. In one embodiment, the application 15 comprises a tool having a nozzle to jet out the fluid. In one embodiment, the fluid system is a tap water distributing system. In one embodiment, the application comprises one or more outlets to output the fluid. In one embodiment, the application or the pump comprises a plurality of outlets having different diameters and one of the outlets is selected to output the fluid. And the relationship between the diameter of the outlet and the flow rate of the fluid follows the equation (1):

$$D = \frac{C \times \sqrt{Q}}{\sqrt[4]{\frac{P}{\rho}}}$$

where D denotes the diameter of the outlet, Q denotes the flow rate of the fluid, P denotes the pressure of the fluid, $\rho$ denotes the specific gravity of the fluid, and C is a coefficient.

Therefore, in the case where the output pressure is needed to be maintained at a set point, the larger the diameter of the outlet is, the larger the flow rate of the fluid will be needed. If the system switches an outlet with a large diameter to another outlet with a small diameter in an instant (for example, less than one second), the flow rate of the liquid must be correspondingly rapidly reduced to maintain the certain liquid pressure. However, conventional PID control does not allow the motor to quickly adjust its frequency, causing the flow rate to be transiently too high, resulting in the pressure exceeding the upper limit and thus the safety valve to be opened.

Figure 2:
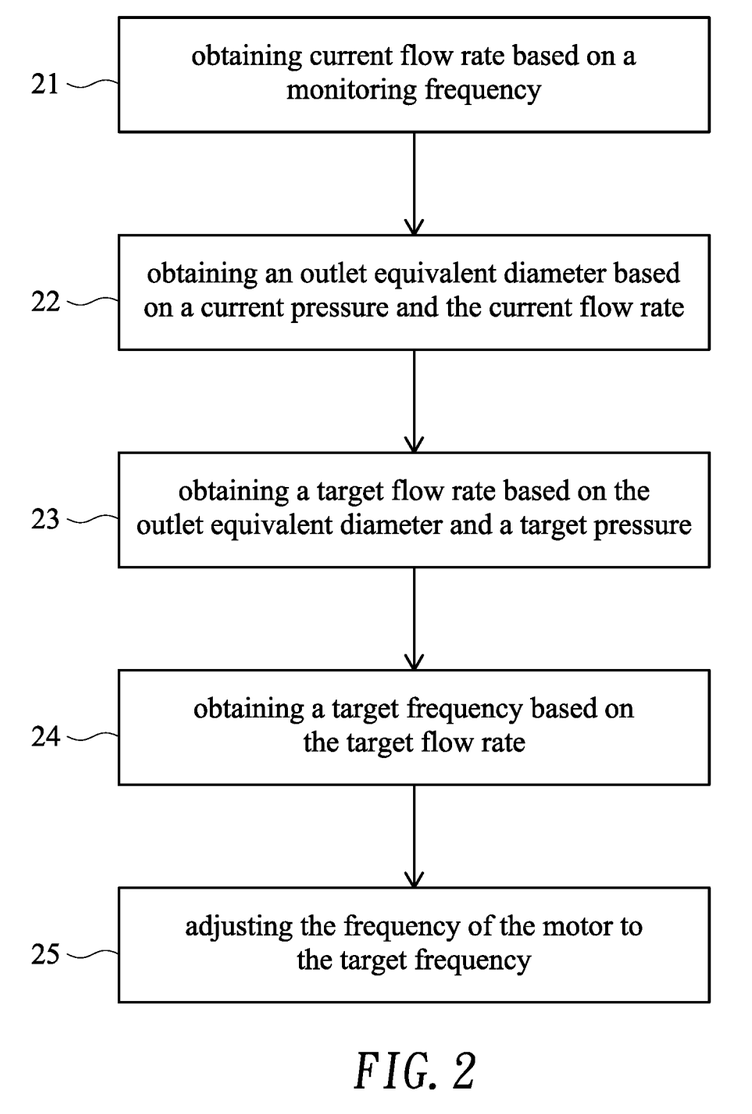
FIG. 2 is a flow chart showing a method for controlling a motor-driven pump in a fluid system according to an embodiment of the present invention.

FIG. 2 is a flow chart showing a method according to an embodiment of this invention. The method is used to maintain the pressure of the one or more outlets at a target pressure. Referring to FIG. 2, in step 21, a current flow rate of the discharged fluid is obtained according to a monitoring frequency of the motor. The monitoring frequency is immediately read from an output terminal of the VFD 13 after the system is switched to another outlet having a different diameter. Since the flow rate of the fluid is a function of the frequency of the motor, the current flow rate can be calculated according to the monitoring frequency. For example, the pump is a fixed-displacement pump and an equation Q=a×f+b can be used to calculate the current flow rate, where Q denotes the flow rate of the discharged fluid, and f denotes the operating frequency of the motor, and both a and b are constant. In one embodiment, the pump is a positive displacement pump that displaces a known quantity of fluid per revolution. The revolutions per minute (RPM) of the pump can be obtained based on the RPM of the motor, which can be obtained by the monitoring frequency of the motor. And the flow rate of the discharged fluid is obtained by multiplying the RPM of the pump by the displacing quantity of fluid per revolution.

Referring to FIG. 2, in step 22, an outlet equivalent diameter is obtained by the equation (1) according to a current pressure and the current flow rate. The specific gravity of the fluid in equation (1), ρ, can be predetermined or obtained by a specific gravity measuring-device mounted on the liquid source 10. In one embodiment, after the system is switched to another outlet, the current pressure is immediately measured by a pressure sensor for monitoring the output pressure of the outlet. In one embodiment, after the system is switched to another outlet, a monitoring power (W) is immediately read from an output terminal of the VFD, and the current pressure is calculated according to the monitoring power (W). In one embodiment, a shaft torque or a shaft horsepower available at the shaft of the motor is read from an output terminal of the VFD after the system is switched to another outlet, and the current pressure is calculated according to the shaft torque (T) or the shaft horsepower.

For example, to determine a pump brake horsepower typically use the following equation (2):

$$BHP = \frac{Q \times P}{\mu}$$

Where BHP denotes the brake horsepower (hp), Q denotes the flow rate of the discharged fluid, P denotes the pressure of the discharged fluid, and μ denotes a coefficient depending on the pump.

In addition, a power level of 1 hp is approximately equivalent to 746 watts (W). Therefore, the current pressure can be calculated by equation (2) based on the monitoring power (W) and the current flow rate (Q) obtained in step 21. Alternatively, the current pressure can be calculated by equation (2) based on the current flow rate (Q) obtained in step 21 and the shaft horsepower obtained from the VFD, and if the shaft torque is read, the shaft horsepower can be first obtained from the shaft torque.

In one embodiment, a monitoring current (A) and a monitoring voltage (V) are immediately read from output terminals of the VFD after the system is switched to another outlet, a monitoring power (W) is calculated based on the monitoring current (A) and the monitoring voltage (V) by the following equations (4) and (5), and the current pressure is calculated according to the monitoring power (W) and the current flow rate (Q) obtained in step 21.

$$Wi = \sqrt{3} \times A \times V \times P_f \quad \text{equation (4)}$$

where $W_i$ denotes the input power of the pump, A denotes the operating current of the motor, and $P_f$ denotes a power factor (constant).

$$W = Wi \times \eta \quad \text{equation (5)}$$

Where W denotes the monitoring power (output power) of the motor, and η denotes an efficiency coefficient of the pump.

Referring to FIG. 2, in step 23, a target flow rate is obtained by the equation (1) according to the outlet equivalent diameter and a target pressure. The fluid system is needed to maintain the outlet at the target pressure. The specific gravity of the fluid in equation (1), ρ, can be predetermined or obtained by a specific gravity measuring-device mounted on the liquid source 10.

Referring to FIG. 2, in step 24, a target frequency is obtained according to the target flow rate. The frequency of the motor is a function of the flow rate of the fluid, and the target frequency can be calculated according to the target flow rate. In step 25, the frequency of the motor is adjusted according to the target frequency.

In one embodiment, steps 21 through 25 of FIG. 2 are repeatedly performed periodically, for example, a plural of times per second, so as to dynamically adjust the frequency of the motor.

Figure 3:
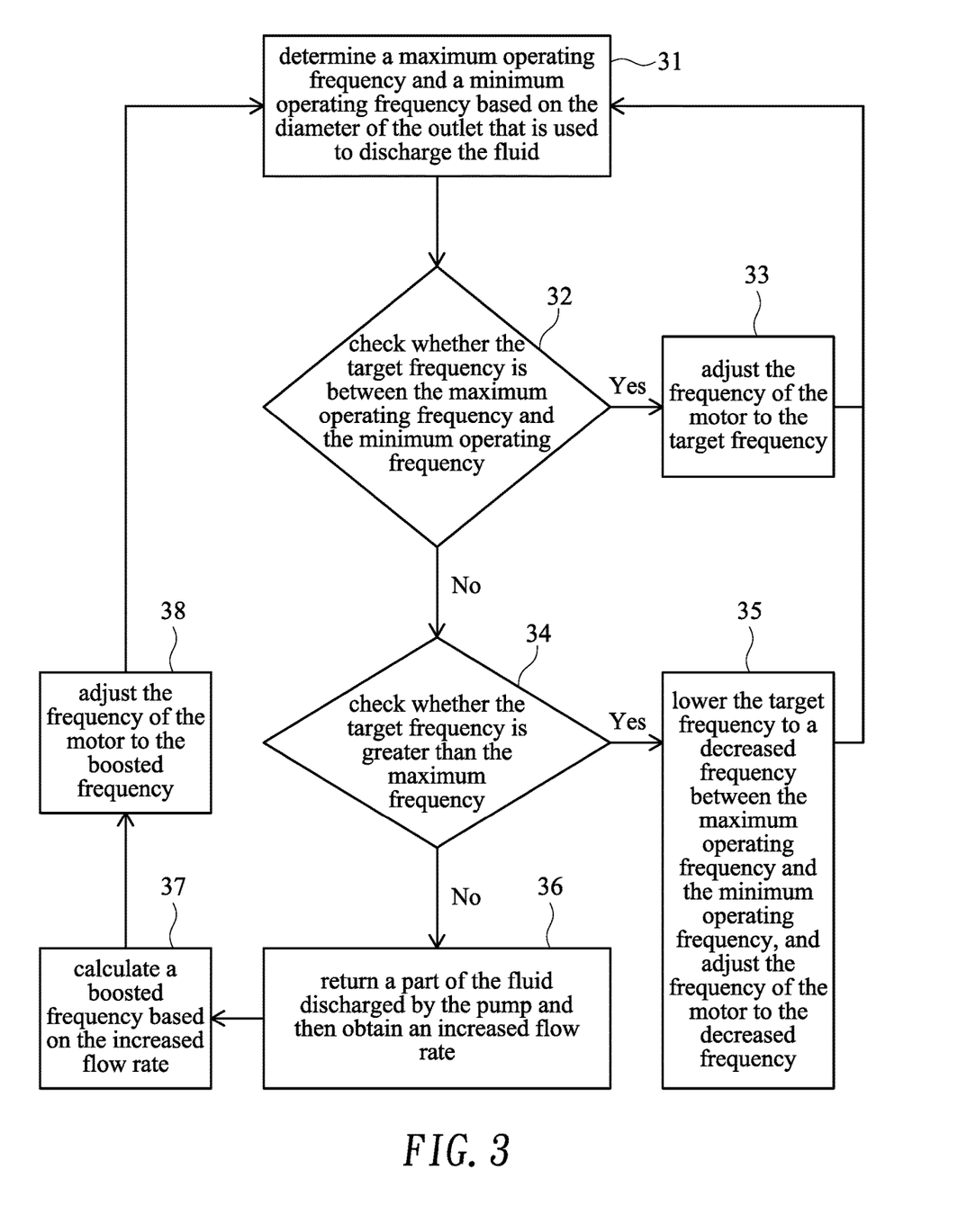
FIG. 3 is a flow chart showing a method for controlling a motor-driven pump in a fluid system according to an embodiment of the present invention.

FIG. 3 is flow chart showing a method according to an embodiment of this invention. The steps of FIG. 3 may be executed to check if the target frequency obtained in FIG. 2 is within a safe operating range.

Referring to FIG. 3, in step 31, a maximum operating frequency ($f_{max}$) and a minimum operating frequency ($f_{min}$) are determined according to the diameter of the current outlet.

Figure 4A:
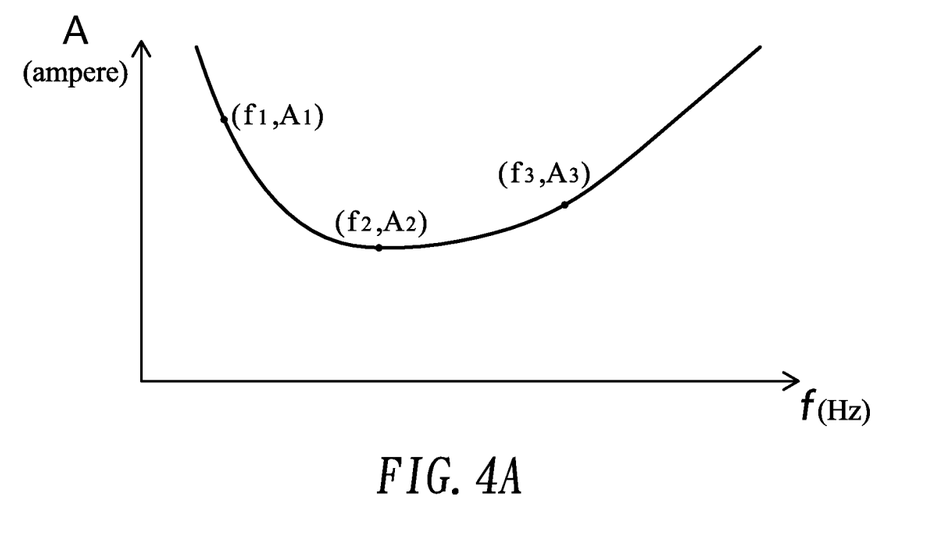
FIGS. 4A and 4B are schematic charts showing a method to determine a maximum operating frequency and a minimum operating frequency of a step in FIG. 3.
Figure 4B:
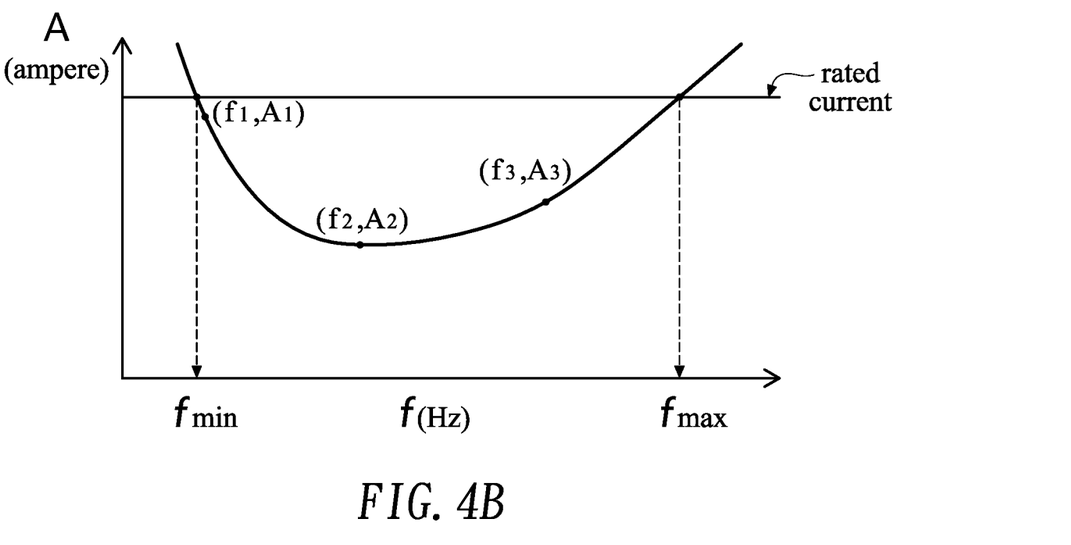

FIGS. 4A and 4B are schematic charts showing a method to obtain the maximum operating frequency ($f_{max}$) and the minimum operating frequency ($f_{min}$). Referring to FIG. 4A, the control unit 14 reads at least three data sets of operating (frequency, current) of the motor 12 from the output terminals of the VFD 13, and from the three data sets can obtain the following quadratic equation:

$$f = aA^2 + bA + c,$$

where f denotes the operating frequency of the motor, A denotes the operating current of the motor, and a, b, and c are constants.

Next, referring to FIG. 4B, a rated current of the motor 12 is obtained from the specification of the motor. The rated current is the maximum limiting current of the motor 12. As shown in FIG. 4B, the rated current intersects the quadratic equation at two points, and the frequencies corresponding to the two points are the maximum operating frequency ($f_{max}$) and the minimum operating frequency ($f_{min}$) of the motor 13 at the given diameter of the outlet. The operating frequency of the motor 12 should be between the minimum operating frequency ($f_{min}$) and the maximum operating frequency ($f_{max}$). In one embodiment, the control unit 14 dynamically reads the operating currents and frequencies from the VFD 13 to correct the obtained quadratic equation. In one embodiment, the obtained quadratic equation is dynamically updated. When the pump 11 is switched to another outlet having a different diameter, the control unit 14 reads again at least three data sets of operating (frequency, current) of the motor 12, so as to obtain a new quadratic equation and a new set of ($f_{max}$; $f_{min}$).

In one embodiment, the quadratic equation is obtained by algebraic operations of the three data sets. In one embodiment, the control unit 14 reads at least three data sets of operating (frequency, current) of the motor 12 from the output terminals of the VFD 13, and a polynomial is obtained from the at least three data sets by Lagrange Interpolation. And the minimum operating frequency ($f_{min}$) and the maximum operating frequency ($f_{max}$) are obtained by the intersection of the rated current and the polynomial. In one embodiment, the obtained polynomial is dynamically updated. The polynomial may comprise, but is not limited to: a unitary quadratic equation, a unitary cubic equation, a unitary polynomial equation, an exponential equation, or a natural logarithmic equation.

Referring to FIG. 3, in step 32, the target frequency obtained in FIG. 2 is checked whether it is between $f_{max}$ and $f_{min}$. In step 33, if the target frequency is between $f_{max}$ and $f_{min}$, then the frequency of the motor is adjusted to the target frequency.

Referring to FIG. 3, in step 34, if the target frequency is not between $f_{max}$ and $f_{min}$, then check if the target frequency is greater than the maximum operating frequency ($f_{max}$). In step 35, if the target frequency is greater than the maximum operating frequency ($f_{max}$), then the target frequency is lowered to a decreased frequency between the maximum operating frequency ($f_{max}$) and the minimum operating frequency ($f_{min}$), and the operating frequency of the motor is adjusted to the decreased frequency. In one embodiment, a warning message is displayed on the screen to inform the user that the operating pressure has been reduced due to the excessive diameter of the outlet.

Referring to FIG. 3, in step 36, if the target frequency is not greater than the maximum operating frequency ($f_{max}$), i.e., less than or equal to the minimum operating frequency ($f_{min}$), then a part of the fluid discharged by the pump is returned to the liquid source or an inlet of the pump via a returning device, e.g., a bypass valve and returning pipes. After a part of the fluid is returned, the flow rate of the fluid is increased to an increased flow rate (Q).

Referring to FIG. 3, in step 37, a boosted frequency is calculated according to the increased flow rate (Q), and, in step 38, the frequency of the motor is adjusted to the boosted frequency.

In detail, the boosted frequency may be calculated by the method described in steps 22-24 of FIG. 2. Firstly, an outlet equivalent diameter is calculated by the equation (1) according to a current pressure and the increased flow rate. In one embodiment, the current pressure is measured by the pressure sensor. In one embodiment, a monitoring power (W) is read from an output terminal of the VFD, and the current pressure is calculated according to the monitoring power (W). After that, a target flow rate is obtained by the equation (1) according to the outlet equivalent diameter and a target pressure. The fluid system is needed to maintain the outlet at the target pressure. Afterwards, a boosted frequency is obtained according to the target flow rate. The frequency of the motor is a function of the flow rate of the fluid, and the boosted frequency can be calculated according to the target flow rate.

Figure 5A:
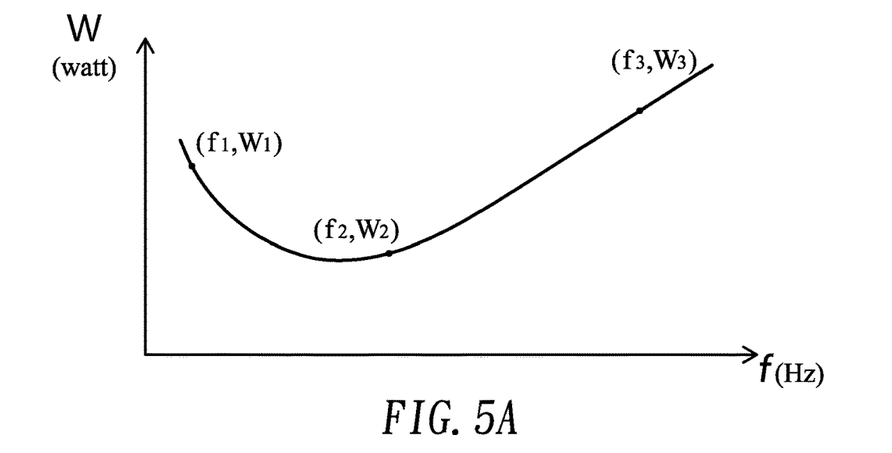
FIGS. 5A, 5B, and 5C are schematic charts showing a method to determine an optimum frequency according to an embodiment of the present invention.
Figure 5B:
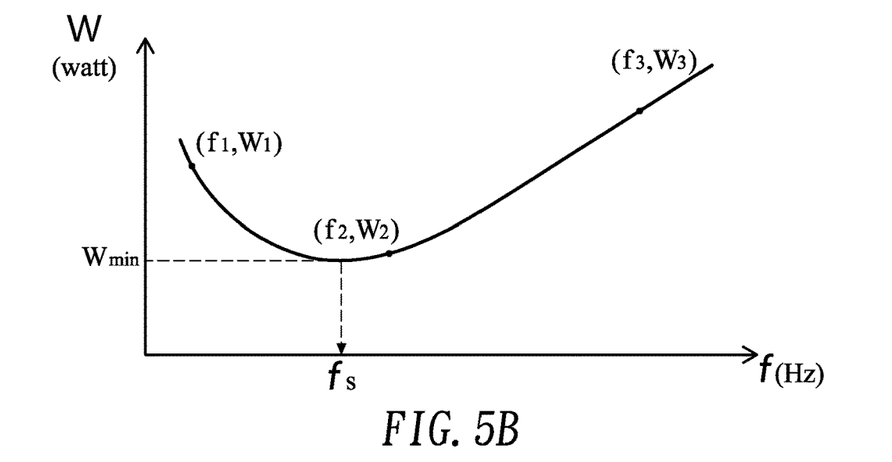

FIGS. 5A and 5B are schematic charts showing a method to obtain a minimum operating power ($W_{min}$) of the pump and an optimum frequency of the motor corresponding to the minimum operating power ($W_{min}$). Referring to FIG. 5A, the control unit 14 reads at least three data sets (frequency, current, voltage) of the motor 12 from the output terminals of the VFD 13, and from the three data sets (($f_1$, $A_1$, $V_1$), ($f_2$, $A_2$, $V_2$), ($f_3$, $A_3$, $V_3$)) can obtain three data sets (($f_1$, $W_1$), ($f_2$, $W_2$), ($f_3$, $W_3$)), which can then be used to obtain the following quadratic equation:

$$f = aW^2 + bW + c,$$

where f denotes the operating frequency of the motor, W denotes the output power of the pump, and a, b, and c are constants.

Where $W_1$, $W_2$, and $W_3$ can be calculated by (($A_1$, $V_1$), ($A_2$, $V_2$), ($A_3$, $V_3$)) using the above mentioned equations (4) and (5).

Next, referring to FIG. 5B, a minimum operating power ($W_{min}$) and an optimum frequency ($f_s$) corresponding to the $W_{min}$ can be obtained from the quadratic equation at the given diameter of the outlet. In one embodiment, the control unit 14 dynamically reads the data sets from the VFD 13 to correct the obtained quadratic equation. In one embodiment, the obtained quadratic equation is dynamically updated. In one embodiment, the quadratic equation is obtained by algebraic operations of the three data sets. In one embodiment, the control unit 14 reads at least three data sets of operating (frequency, current, voltage) of the motor 12 from the output terminals of the VFD 13, and a polynomial is obtained from the at least three data sets by Lagrange Interpolation. The optimum frequency ($f_s$) can be obtained by the polynomial using the above-mentioned method. In one embodiment, the obtained polynomial is dynamically updated. The polynomial may comprise, but is not limited to: a unitary quadratic equation, a unitary cubic equation, a unitary polynomial equation, an exponential equation, or a natural logarithmic equation. In some situations, the motor is operated with the optimum frequency ($f_s$) to conserve the output power of the pump.

Figure 5C:
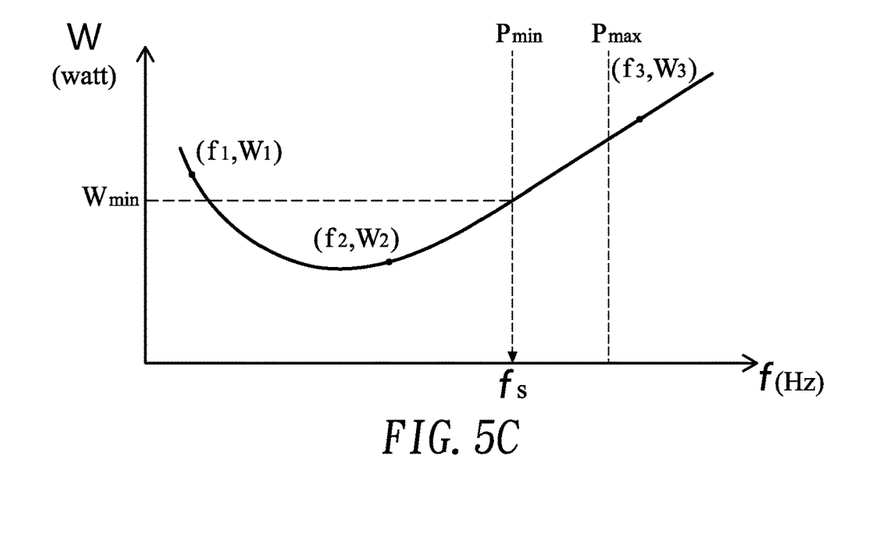

Referring to FIG. 5C, one embodiment of this invention provides a method to maintain the pressure of the one or more outlets within a pressure range (e.g., $P_{min}$<target pressure<$P_{max}$). A minimum operating power ($W_{min}$) is the lowest operating power within the pressure range, and an optimum frequency (fs) is the frequency corresponding to the $W_{min}$. The motor is operated with the optimum frequency ($f_s$) to conserve the output power of the pump.

Figure 6A:
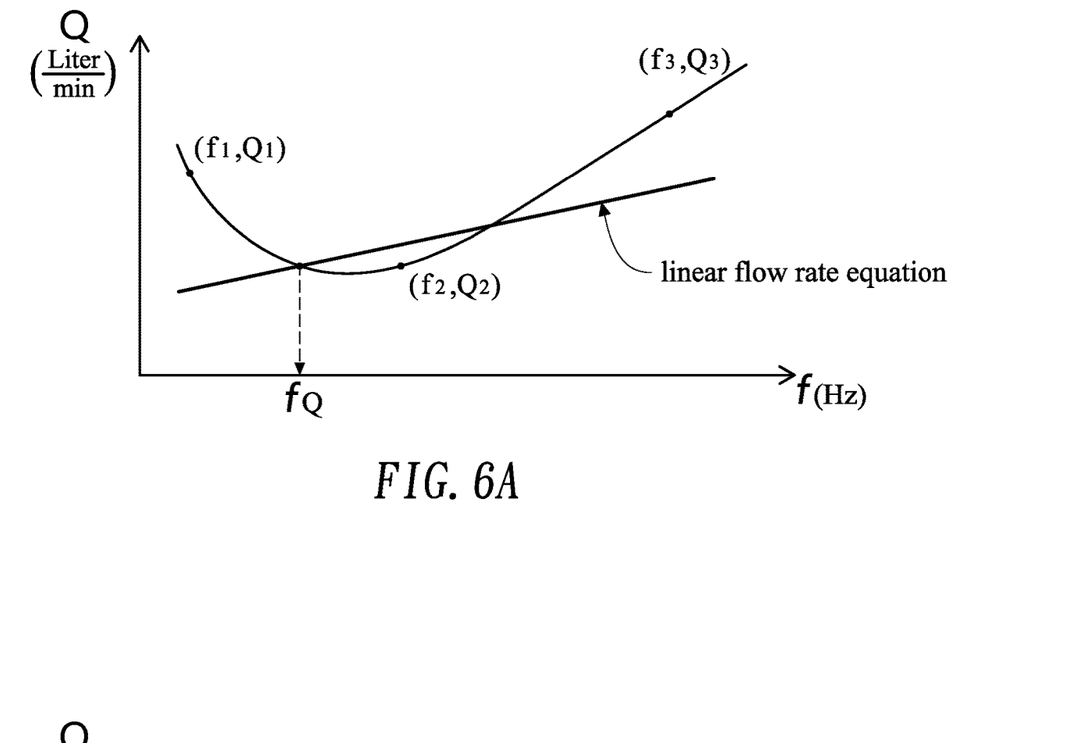
FIGS. 6A and 6B are schematic charts showing a method to determine an optimum frequency according to an embodiment of the present invention.
Figure 6B:
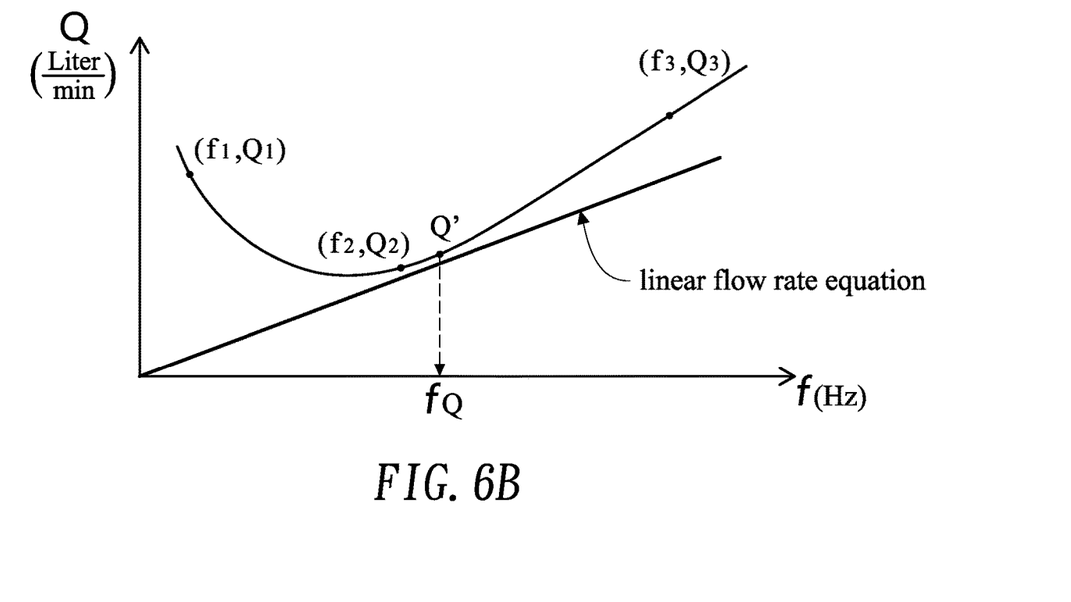

FIGS. 6A and 6B are schematic charts showing a method to obtain an optimum frequency. Referring to FIG. 6A, the control unit 14 reads at least three data sets (frequency, current, voltage) of the motor 12 from the output terminals of the VFD 13, and from the three data sets (($f_1$, $A_1$, $V_1$), ($f_2$, $A_2$, $V_2$), ($f_3$, $A_3$, $V_3$)) obtain three data sets (($f_1$, $W_1$), ($f_2$, $W_2$), ($f_3$, $W_3$)), which then be used to obtain three data sets (($f_1$, $Q_1$), ($f_2$, $Q_2$), ($f_3$, $Q_3$)), which then be used to obtain the following quadratic equation:

$$f = aQ^2 + bQ + c,$$

where f denotes the operating frequency of the motor, Q denotes the flow rate of the discharged fluid, and a, b, and c are constants.

Where $W_1$, $W_2$, and $W_3$ can be calculated by (($A_1$, $V_1$), ($A_2$, $V_2$), ($A_3$, $V_3$)) using the equation (4), and Q1, Q2, and Q3 can be calculated by $W_1$, $W_2$, and $W_3$ using the equation (2). The pressure of the discharged fluid in equation (2) can be obtained from the pressure sensor.

In one embodiment, the control unit 14 dynamically reads the data sets from the VFD 13 to correct the obtained quadratic equation. In one embodiment, the obtained quadratic equation is dynamically updated. In one embodiment, the quadratic equation is obtained by algebraic operations of the three data sets. In one embodiment, the control unit 14 reads at least three data sets of operating (frequency, current, voltage) of the motor 12 from the output terminals of the VFD 13, and a polynomial is obtained from the at least three data sets by Lagrange Interpolation. The polynomial may comprise, but is not limited to: a unitary quadratic equation, a unitary cubic equation, a unitary polynomial equation, an exponential equation, or a natural logarithmic equation. In one embodiment, the obtained polynomial is dynamically updated.

Next, the pump is a positive displacement pump that displaces a known quantity of fluid per revolution and a linear flow rate equation $Q=c \times f+d$ can be obtained, where Q denotes the flow rate of the discharged fluid, f denotes the operating frequency of the motor, and both c and d are constant.

Referring to FIG. 6A, if the linear flow rate equation intersects the quadratic equation (or the polynomial) at two points, the frequency corresponding to the point with the lower flow rate will be the optimum frequency ($f_O$) and the motor may be operated with the optimum frequency.

Referring to FIG. 6B, if the linear flow rate equation does not intersect the quadratic equation (or the polynomial), find a flow rate (Q') that has a shortest distance with the flow rate linear equation and the optimum frequency ($f_O$) is the frequency corresponding to the flow rate (Q').

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A method for controlling a pump in a fluid system, wherein the pump discharges a fluid through one of a plurality of outlets having different diameters and is driven by a motor, and the method comprises the steps of:
   obtaining a current flow rate of the discharged fluid according to a monitoring frequency of the motor;
   obtaining an outlet equivalent diameter according to a current pressure of the discharged fluid and the current flow rate;
   obtaining a target flow rate according to the outlet equivalent diameter and a target pressure of the discharged fluid;
   obtaining a target frequency according to the target flow rate; and
   adjusting a frequency of the motor to the target frequency.

2. The method as recited in claim 1, further comprising:
   determining a maximum operating frequency and a minimum operating frequency of the motor based on a diameter of the outlet that is selected to discharge the fluid; and
   determining whether the target frequency is between the maximum operating frequency and the minimum operating frequency.

3. The method as recited in claim 2, wherein the maximum operating frequency and the minimum operating frequency are determined by the steps of:
   dynamically obtaining at least three data sets of operating frequency and operating current of the motor;
   determining a polynomial based on the at least three data sets of operating frequency and operating current of the motor;
   obtaining a rated current of the motor;
   intersecting the polynomial with the rated current to determine the maximum operating frequency and the minimum operating frequency.

4. The method as recited in claim 3, wherein the polynomial comprises a unitary quadratic equation, a unitary cubic equation, a unitary polynomial equation, an exponential equation, or a natural logarithmic equation.

5. The method as recited in claim 3, wherein the polynomial is obtained by Lagrange Interpolation using the at least three data sets.

6. The method as recited in claim 2, wherein if the target frequency is between the maximum operating frequency and the minimum operating frequency, then the frequency of the motor is adjusted to the target frequency.

7. The method as recited in claim 2, wherein if the target frequency is greater than the maximum operating frequency, then the target frequency is lowered to a decreased frequency between the maximum operating frequency and the minimum operating frequency, and the operating frequency of the motor is adjusted to the decreased frequency.

8. The method as recited in claim 2, wherein if the target frequency is less than the minimum operating frequency, then a part of the fluid discharged by the pump is returned to a fluid source or an inlet of the pump via a returning device, and the flow rate of the discharged fluid is increased to an increased flow rate.

9. The method as recited in claim 8, further comprising:
calculating a boosted frequency according to the increased flow rate; and
adjusting the frequency of the motor to the boosted frequency.

10. The method as recited in claim 1, wherein the fluid system comprises a variable frequency drive electrically coupled to the motor, and the monitoring frequency is read from the variable frequency drive.

11. The method as recited in claim 1, further comprising:
determining a polynomial based on at least three data sets of operating frequency of the motor and output power of the pump;
determining a minimum output power within a pressure range of the polynomial, wherein the target pressure is within the pressure range;
determining an optimum frequency corresponding to the minimum output power; and
operating the motor with the optimum frequency.

12. The method as recited in claim 11, wherein the polynomial comprises a quadratic equation.

13. The method as recited in claim 11, wherein the polynomial is obtained by Lagrange Interpolation using the at least three data sets.

14. The method as recited in claim 1, further comprising:
determining a polynomial based on at least three data sets of operating frequency of the motor and flow rate of the discharged fluid;
determining a linear flow rate equation of the pump;
determining a flow rate of the polynomial that is obtained by intersecting the polynomial with the linear flow rate equation or that has a shortest distance with the linear flow rate equation;
determining an optimum frequency corresponding to the flow rate; and
operating the motor with the optimum frequency.

15. The method as recited in claim 1, wherein the current pressure of the discharged fluid is obtained from a pressure sensor.

16. The method as recited in claim 1, wherein the fluid system comprises a variable frequency drive electrically coupled to the motor, a shaft horsepower of the motor is read from the variable frequency drive, and the current pressure of the discharged fluid is calculated based on the shaft horsepower and the current flow rate.

17. The method as recited in claim 1, wherein the fluid system comprises a variable frequency drive electrically coupled to the motor, a shaft torque of the motor is read from the variable frequency drive, a shaft horsepower is obtained from the shaft torque, and the current pressure of the discharged fluid is calculated based on the shaft horsepower and the current flow rate.

* * * * *